(12) United States Patent
Hirsch et al.

(10) Patent No.: US 12,463,714 B2
(45) Date of Patent: Nov. 4, 2025

(54) METHODS FOR THE TRANSMISSION OF DATA BETWEEN A RESOURCE CONSTRAINED DEVICE AND A NON-GEOSTATIONARY SATELLITE AND ASSOCIATED METHOD

(71) Applicant: EUTELSAT SA, Issy-les-Moulineaux (FR)

(72) Inventors: Antonin Hirsch, Issy-les-Moulineaux (FR); Geoffroy Brichler, Issy-les-Moulineaux (FR)

(73) Assignee: EUTELSAT SA, Issy-les-Moulineaux (FR)

( * ) Notice: Subject to any disclaimer, the term of this patent is extended or adjusted under 35 U.S.C. 154(b) by 347 days.

(21) Appl. No.: 18/012,211

(22) PCT Filed: Jul. 2, 2020

(86) PCT No.: PCT/IB2020/000888
§ 371 (c)(1),
(2) Date: Dec. 21, 2022

(87) PCT Pub. No.: WO2022/003388
PCT Pub. Date: Jan. 6, 2022

(65) Prior Publication Data
US 2023/0299844 A1    Sep. 21, 2023

(51) Int. Cl.
*H04L 1/00* (2006.01)
*H04B 7/185* (2006.01)
*H04W 24/10* (2009.01)

(52) U.S. Cl.
CPC ........ *H04B 7/18519* (2013.01); *H04W 24/10* (2013.01)

(58) Field of Classification Search
CPC .......................... H04W 24/10; H04B 7/18519
See application file for complete search history.

(56) References Cited

U.S. PATENT DOCUMENTS 11,943,706 B2 *  3/2024  Sedin ................ H04B 7/18513
2017/0192095 A1 *  7/2017  Jobanputra ........ H04B 7/18517
(Continued)

FOREIGN PATENT DOCUMENTS

CN        110545138 A      12/2019
WO    WO 2020/092566 A1     5/2020

OTHER PUBLICATIONS

International Search Report as issued in International Patent Application No. PCT/IB2020/000888, dated Apr. 9, 2021.
(Continued)

*Primary Examiner* — Abdelnabi O Musa
(74) *Attorney, Agent, or Firm* — Pillsbury Winthrop Shaw Pittman LLP (57) ABSTRACT

A method for the transmission to at least one non-geostationary satellite of at least one piece of data stored by a ground-based device, the method being carried out by the non-geostationary satellite and including performing periodically at least one radio coverage measurement, computing a dynamic elevation emission criterion based on the last radio coverage measurement performed, emitting at least one signal periodically towards the Earth, the signal including at least the dynamic elevation emission criterion, if the position of the non-geostationary satellite relative to the position of the ground-based device verifies the dynamic elevation emission criterion: receiving at least one signal sent by the ground-based device, the signal including at least one piece of data stored by at least one ground-based device.

9 Claims, 6 Drawing Sheets

(56) References Cited

U.S. PATENT DOCUMENTS

| | | | |
|---|---|---|---|
| 2017/0237482 A1* | 8/2017 | Noerpel | H04B 7/2041 |
| | | | 455/427 |
| 2020/0178135 A1* | 6/2020 | Yun | H04W 36/0061 |
| 2021/0242934 A1* | 8/2021 | Qiao | H04W 72/12 |
| 2021/0247519 A1* | 8/2021 | Reid | B64G 1/1014 |
| 2022/0224404 A1* | 7/2022 | Xu | H04B 7/18513 |
| 2024/0098616 A1* | 3/2024 | Schloemer | H04W 40/12 |

OTHER PUBLICATIONS

Ali, I., et al., "Doppler Characterization for LEO Satellites," IEEE Transactions on Communications, vol. 46, No. 3, Mar. 1998, pp. 309-313.

* cited by examiner

METHODS FOR THE TRANSMISSION OF DATA BETWEEN A RESOURCE CONSTRAINED DEVICE AND A NON-GEOSTATIONARY SATELLITE AND ASSOCIATED METHOD

CROSS-REFERENCE TO RELATED APPLICATIONS

This application is the U.S. National Stage of PCT/IB2020/000888, filed Jul. 2, 2020, The content of this application is incorporated herein by reference in its entirety.

TECHNICAL FIELD

The technical field of the invention is the field of communications in systems comprising non-geostationary satellites and ground-based devices.

The present document concerns methods for the transmission of data between a resource-constrained device and a non-geostationary satellite and associated system, and particularly wherein the non-geostationary satellite is a low earth orbit ("LEO") satellite and wherein communications are enhanced by leveraging the use of a beacon signal of the LEO satellite.

STATE OF THE ART

With the development of Internet of Things ("IoT") networks and Low-Power Wide-Area Networks ("LP-WAN"), Low Earth Orbit satellites constellations have been found to be of interest as they particularly well integrate with such systems. Indeed, LEO satellites allow a global coverage starting from just one satellite. LEO satellites constellations are for example used for data collection, to retrieve data from parts of LPWAN or IoT networks and to deliver the data to other parts of said networks.

Most of the time, these constellations are used to retrieve data from ground-based objects unable to communicate with the rest of the network due to their location, and to deliver said data to ground-based stations of the network to make the data accessible by the rest of the network. The objects emit messages to the LEO satellites when in radio visibility of a satellite and the LEO satellites emit the messages to the ground-based stations when in radio visibility of a ground-based station. The LEO satellites constellations are therefore used as relays in the systems comprising the constellation and a LPWAN or IoT network.

In the majority of these systems, such as Argos®, Orbcomm® etc., the coverage offered by the LEO constellation is not constant, meaning that the object does not always have a LEO satellite in radio visibility in order to transmit its messages.

In order to be able to transmit, the object needs to predict the future passage of a satellite in the constellation and often also needs to know its relative position within the satellite visibility to transmit within the radio coverage of the system and to optimize the radio transmission as the satellite visibility is not equal to its radio coverage.

Existing systems rely on constellation ephemerides to predict the passage of the LEO satellites and time windows for transmission. The use of ephemerides has two main disadvantages.

First, to be able to predict the next passage of the LEO satellite, it is necessary that the transmitting object also knows its own position, which implies:

In the case of a fixed transmitter object, to indicate to the transmitter object its position when it is put into service, In the case of a mobile transmitter object, to add a radio positioning system (e.g. of the geo-positioning system "GPS" type). The addition of a GPS has a significant impact on the cost of the radio module of the object and on battery consumption of the object, which is a critical characteristic of LPWA transmissions by nature for which transmitters must be able to transmit messages for several years with very limited power source.

A second disadvantage is that it is necessary to transmit ephemeris to the object on a regular basis (specifically for satellites orbiting at 500 to 600 km altitudes, due to the imprecision on the modelling of the drag perturbation). The transmitter needs a refresh of the ephemeris:

with a frequency of the order of magnitude of few weeks to ensure that the error on the passage estimate is sufficiently reliable, and/or with a frequency of the order of magnitude of the day if it is necessary to estimate a short window such as the satellite visibility time for the object.

To transmit an updated ephemeris, it is necessary:

either that the transmitter downloads this information from a source external to the satellite (e.g. via a terrestrial network) and thus for the mobile object to be in visibility of the terrestrial network sufficiently regularly. In many applications this is not the case. For example, in the case of maritime transport, containers can spend several weeks/months at sea.

either that the LEO satellite broadcasts these ephemerides via a communication channel to the objects. The problem with this solution is that it has a significant impact on the LEO satellite, requiring the implementation of a transmission channel of several hundred bits per second. Moreover, the reception of these ephemerides by the object may consume a significant amount of power and therefore impacts the autonomy.

Another problem of mobile ground-based objects is linked to the reception frequency of the LEO satellite. The frequencies used vary geographically from country to country. For example, the ISM bands in the United States (902-921 MHz) are different from those used in Europe (868-870 MHz), so hybrid objects communicating via satellite must be provided with central frequency and bandwidth information. For mobile objects this requires to know its position (via a positioning module such as GPS) and to have a table referencing the regulatory frequencies. In the same way as for ephemerides, it is currently necessary for the object to be covered by or connected to a terrestrial network in order to download or update this information.

A major problem is that current systems require ground-based objects to be equipped with a GPS for collecting and having information on the position of an object and to transfer this information. This requirement has an impact on the cost and energy consumption of the ground-based object. This position data can further be intercepted by an entity that is not the intended recipient of the information.

Another problem is a collision problem, linked with the distribution of the ground-based objects in the radio coverage of the satellite: when several of the objects want to emit at the same time, there is a risk of collision of the signals, and therefore a problem may arise where the LEO satellite does not receive all of the data from all of the objects. There is no solution in the state of the art that permits to reduce the collisions while requiring low energy consumption from the objects.

Another problem is that, in the ISM (industrial, scientific and medical) bands, the level of interference will vary with time. The noise floor will raise in dense radio areas (e.g. when the satellite passes over big cities). This could result in a reduction of the area over which the link budget closes. In such cases, the objects within the radio reception coverage but located at the edge of the coverage will try to transmit their frame but the frames will not be decoded by the satellite as the link budget does not close (i.e. does not result in appositive link margin). This results in a degraded Quality of Service (QoS).

There is therefore a need for a solution to enable ground-based devices to send data to a satellite with enhanced quality of service while requiring less energy and having a low cost of the ground-based device.

SUMMARY OF THE INVENTION

The present document solves the above-mentioned problems by providing solutions for a low-cost ground-based device to be able to transmit data with enhanced quality of service while requiring low power.

According to a first aspect of the invention, this is satisfied by providing a method for the transmission to at least one non-geostationary satellite of at least one piece of data stored by a ground-based device, the method being carried out by the non-geostationary satellite and comprising the following steps:
  Performing periodically at least one radio coverage measurement,
  Computing a dynamic elevation emission criterion based on the last radio coverage measurement performed,
  Emitting at least one signal periodically towards the Earth, the signal comprising at least the dynamic elevation emission criterion,
  If the position of the non-geostationary satellite relative to the position of the ground-based device verifies the dynamic elevation emission criterion:
    Receiving at least one signal sent by the ground-based device, the signal comprising at least one piece of data stored by at least one ground-based device.

Thanks to the invention, the ground-based device is ensured to always send data when the non-geostationary satellite is in radio coverage and will be able to receive the data as the noise level is low enough to do so. The non-geostationary satellite performs periodical measurements of the radio noise to keep an up-to-date elevation criterion in the beacon signal. This solution permits to have a ground-based device that consumes low amounts of energy by performing the measurement on the non-geostationary satellite side and transmitting this information in a low-energy consuming way.

The method according to the invention may also have one or more of the following characteristics, considered individually or according to any technically possible combinations thereof:
  the radio coverage measurement comprises a spectrum analysis, a noise floor measurement and an interferences measurement.
  the dynamic elevation emission criterion computing comprises computing a link budget, the link budget computation being carried out using the radio coverage measurement, a satellite reception frequency and a satellite radio coverage for the reception frequency.
  the periods at which the radio coverage measurement and the emission are performed are different.

Another aspect of the invention relates to a communication system for the transmission to at least one non-geostationary satellite of at least one piece of data stored by a ground-based device wherein the non-geostationary satellite is configured to carry out the method according to a first aspect of the invention.

The communication system according to the invention may also have one or more of the following characteristics, considered individually or according to any technically possible combinations thereof:
  the non-geostationary satellite is a low Earth orbit satellite or a medium Earth orbit satellite.
  the ground-based device is a resource-constrained device.

Another aspect of the invention relates to a computer program product comprising instructions which, when the program is executed by a computer, causes the computer to carry out any one of the methods according to the invention.

Another aspect of the invention relates to a computer-readable medium comprising instructions which, when executed by a computer, cause the computer to carry out any one of the methods according to the invention.

The invention finds a particular interest when the ground-based devices are mobile and have no connection possible to a ground-based network. Indeed, the invention permits to resources-constrained ground-based devices to have enough autonomy to transmit data to non-geostationary satellites for long periods of time without having to maintain ephemerides and without relying on GPS while being able to change position, always having an accurate positioning and enhanced quality of service independently of their position.

BRIEF DESCRIPTION OF THE FIGURES

Other characteristics and advantages of the invention will become clear from the description that is given thereof below, by way of indication and in no way limiting, with reference to the appended figures, among which.

DETAILED DESCRIPTION

For greater clarity, identical or similar elements are marked by identical reference signs in all of the figures.

Figure 1:
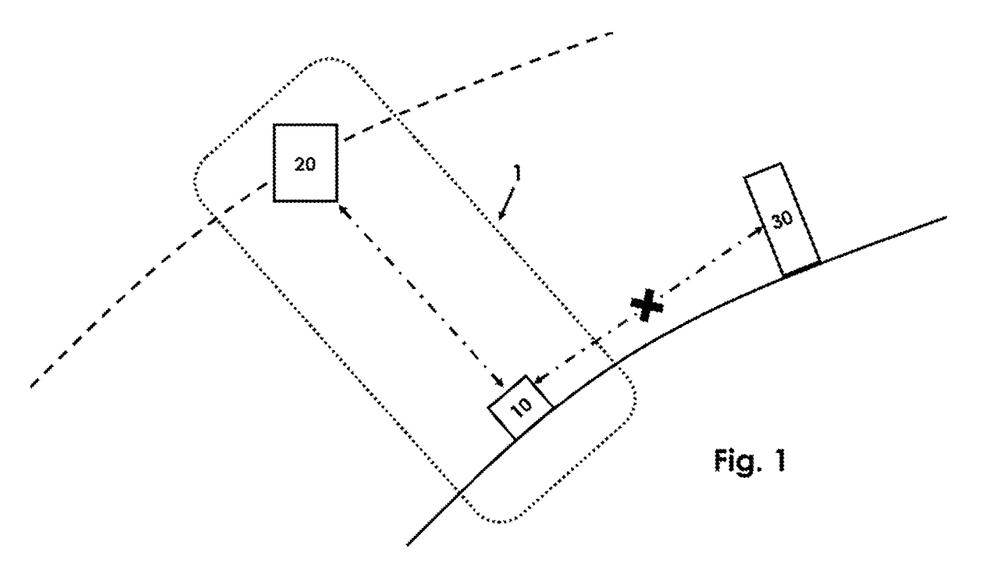
FIG. 1 is a schematic representation of a communication system according to the invention.

FIG. 1 presents the communication system 1 implementing the methods according to the invention. The communication system 1 comprises a non-geostationary satellite 20 and a ground-based device 10.

The non-geostationary satellite 20 is a satellite orbiting a celestial body such as the Earth. When the non-geostationary satellite 20 orbits the Earth, it can then be a low Earth orbit satellite (with an orbit altitude below 2000 km) or a medium Earth orbit satellite (with an orbit altitude above 2000 km and below geosynchronous orbit). The non-geostationary satellite 20 comprises at least a processor and a memory, the memory storing instructions which, when executed by the processor, cause the processor to carry out steps of the methods described later. The non-geostationary 20 further comprises at least one communication payload, the communication payload comprising at least one transponder configured to receive and send signals towards the celestial body. The signal can be sent in spot beams of different width, for example 40 or 60 degrees (satellite beam half Field of View).

The ground-based device is a device comprising at least a processor and a memory, the memory storing instructions which, when executed by the processor, cause the processor to carry out steps of the methods described later. Preferably, the ground-based device 10 is a mobile device, meaning that the device is able to be moved for example by having a low weight or by comprising means making it able to be moved. Preferably, the ground-based device 10 is a resource-constrained device. It is understood by a resource-constrained device a device comprising a limited processor and/or limited memory such as a low-cost processor and/or a low-cost memory or such as an Internet of Things device, able to connect to an IoT network such as a Sigfox® network, a Lora® network or any other network permitting to link IoT devices. Further, the ground-based device comprises at least a communication module configured to communicate, that is to receive and send signals, at least with the non-geostationary satellite 20. Further, the communication module of the ground-based device 10 can be configured to communicate through a ground-based IoT network or through any other network, via wired means or wirelessly, for example towards a ground-based station 30. To communicate through a ground-based IoT network or through any other network, via wired means or wirelessly, for example towards a ground-based station 30, the ground-based device 10 can comprise another communication module. In the example represented at FIG. 1, the ground-based device 10 is unable to reach the ground-based station 30 directly or to reach a network permitting to reach the ground-based station 30. The ground-based device 10, preferably resource-constrained, is able to reach the non-geostationary satellite 20 using at least one of the methods according to the invention described in the present document.

Figure 2:
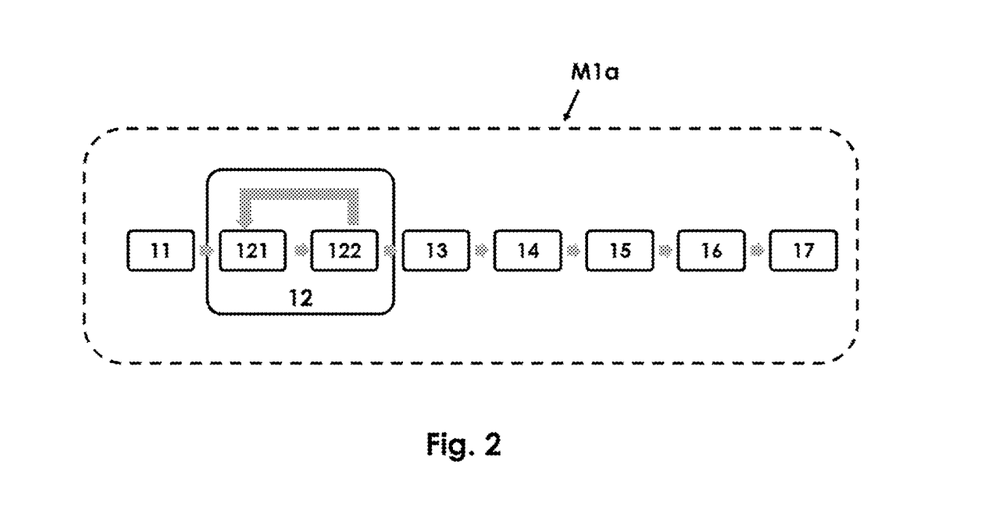
FIG. 2 is a schematic representation of a method according to the invention carried out by a ground-based device.

A first method according to the invention is represented FIG. 2. The method M1a represented FIG. 2 is carried out by the ground-based device 10 and comprises six steps.

In a first step 11, the ground-based device 10 enters an awaken mode. The ground-based device 10 can for example have several functioning modes, such as an awaken mode and an asleep mode. In an asleep mode, the ground-based device 10 can be unable to receive communications and thus saves energy. The ground-based device 10 in an asleep mode can have limited processing abilities. In an awaken mode, the ground-based device 10 is in active search of a signal from the non-geostationary satellite 20. The awaken mode is entered at periodic times, for example for 5 seconds every minute. That way, the ground-based device 10 saves energy compared to the state of the art and is still able to communicate with the non-geostationary satellite 20. When in awaken mode, the ground-based device listens for at least one signal from the non-geostationary satellite 20. If the ground-based device 10 does not receive at least one signal during the time it is in awaken mode, for example during the 5 seconds, it goes back to the asleep mode for a predetermined period of time.

In a step 12, successive Doppler shift estimations are performed. A Doppler shift estimation comprises two sub-steps 121 and 122.

First, in a sub-step 121 of reception, the ground-based device 10 receives, during the time the ground-based device 10 is in awaken mode, at least one signal from the non-geostationary satellite 20. This signal will be hereinafter referred to equally as "beacon signal" or as "signal". The received signal comprises at least one frequency parameter of the current reception frequency used by the non-geostationary satellite 20 and at least one elevation emission criterion. Advantageously, the invention permits to use both the fact that a signal is received to estimate a Doppler shift and the content of the received signal to enhance the abilities of the ground-based device 10 while limiting its energy consumption.

Figure 4:
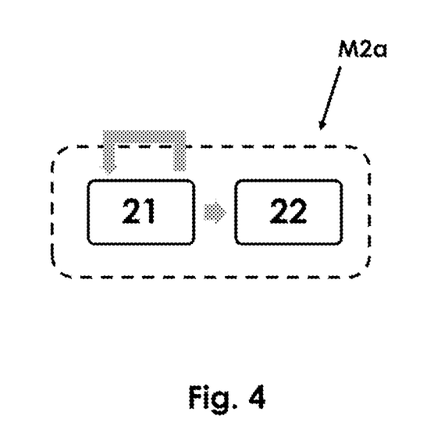
FIG. 4 is a schematic representation of a method according to the invention carried out by a non-geostationary satellite.

This reception follows the emission of the signal by the non-geostationary satellite 20 at a step 21 of the method M2a represented at FIG. 4. In the method M2a, the step of emitting the signal towards the ground-based device 10 is performed periodically by the non-geostationary satellite 20, the signal comprising the at least one frequency parameter of the current reception frequency used by the non-geostationary satellite 20 and the at least one elevation emission criterion. This step is for example repeated periodically for 1 second every 5 seconds to save energy on the non-geostationary satellite 20 side but can also be performed continuously. When performed continuously on the satellite side, as opposed to for 1 second every 5 seconds, the ground-based device 10 can also listen 5 times less. Thus, this parameter must be chosen by taking into account both the power onboard the non-geostationary satellite 20 and the autonomy of the ground-based device 10.

It will be understood by "frequency parameter" any indication enabling the ground-based device 10 to obtain the current reception frequency used by the non-geostationary satellite 20 at the time of emission of the signal. The current reception frequency preferably comprises the central frequency and the channel width to be used. The indication is preferably encoded in bits in the signal. The number of bits depends on the total number of possible reception frequencies used by the non-geostationary satellite 20. For example, for 8 different reception frequencies (or for 8 different radio configurations), only 3 bits can be used, and for 16 different reception frequencies, 4 bits can be used. When receiving the indication, the ground-based device 10 checks for example a lookup table where a number in bit format is linked to a given frequency that should be used and a channel width. For example, a first configuration could be a European configuration, where the central frequency is 868.4 MHz and a channel width is 400 kHz. In another configuration, for example in Asia, the central frequency can be 902 MHz with a channel width of 400 kHz. In another embodiment, the parameter can be directly comprised in the signal, by inserting in the signal the frequency that should be used when emitting to the non-geostationary satellite 20 and the channel width. This removes the need for a frequency lookup table in the ground-based device 10 but makes the signal data larger. The invention covers any other way of formatting this information for transmission to the ground-based device 10 in the beacon signal or for transmission to the ground-based device 10 using the beacon signal.

It will be understood by "elevation emission criterion" any indication enabling the ground-based device to obtain a criterion defining a minimum elevation above the ground-based device 10 that the non-geostationary satellite 20 should verify for the ground-based device 10 to emit to the non-geostationary satellite 20. When receiving the indication, the ground-based device comprises for example a lookup table where a number in bit format is linked to an elevation threshold. The indication is preferably encoded in bits in the signal. The number of bits can depend on the number of possible radio configurations. The possible radio configurations can depend on the width of the non-geostationary satellite 20 beam. For example, two possible configurations can be "Narrow" for a narrow beam and "Wide" for a wide beam. When receiving the indication, the ground-based device 10 checks for example a lookup table where a configuration number in bit format is linked to a given elevation threshold that should be used to emit to the non-geostationary satellite 20. An elevation threshold can be linked to each configuration. For example, for a wide beam configuration, an elevation threshold of 20 degrees can be specified while for a narrow beam configuration an elevation threshold of 45 degrees can be specified. In another embodiment, the elevation criterion can be directly comprised in the signal, by inserting in the signal the elevation threshold that should be used when emitting to the non-geostationary satellite 20. This removes the need for a frequency lookup table in the ground-based device 10 but makes the signal data larger. The invention covers any other way of formatting this information for transmission to the ground-based device 10 in the beacon signal or for transmission to the ground-based device 10 using the beacon signal.

In a sub-step 122, the ground-based device 10 performs a Doppler shift estimation based on the frequency of the received signal. Such a Doppler shift, in Hz, is retrieved by computing the difference between a received frequency of a continuous wave emitted in the signal, and the expected frequency at emission of the continuous wave stored by the ground-based device 10.

As the ground-based device 10 is preferably a resource-constrained device, it performs the previous Doppler shift estimation using low-cost or low-quality oscillators. As such, the Doppler shift estimations performed by the ground-based device 10 are heavily biased, introducing errors that can exceed the total amplitude of the Doppler shift. The bias is typically of around 20 ppm while the Doppler shift varies of +/−23 ppm for an altitude of 550 km. The invention permits to overcome that problem by performing successive Doppler shift estimations in a step 12, as represented FIG. 2 and FIG. 5, and by estimating Doppler rates of change based on a plurality of frequency Doppler rates of change based on the successive Doppler shift estimations.

The successive Doppler shift estimations can be performed on a fixed period basis, such as for example every 5 seconds, or on an irregular period basis, such as for example spaced of 5 seconds, then spaced of 20 seconds, then spaced of 15 seconds, then spaced of 5 seconds, or for example five measures spaced of 5 seconds, then to wait for 30 seconds and then again five measures of 5 seconds etc. The irregular period basis is more efficient than the regular period as, for a fixed number of Doppler shift measurement, i.e. a same energy consumption, it is more effective to carry out for example five measures spaced of 5 seconds, then to wait for 30 seconds and then to carry out again five measures of 5 seconds, rather than carrying out ten measures spaced of 5 seconds. Indeed, in the first case, the covered satellite orbital arc is larger than in the second case, and so the estimation precision of the geometry of the pass above the ground-based device 10 is improved, for the same energy consumption in the first and second case.

Figure 5:
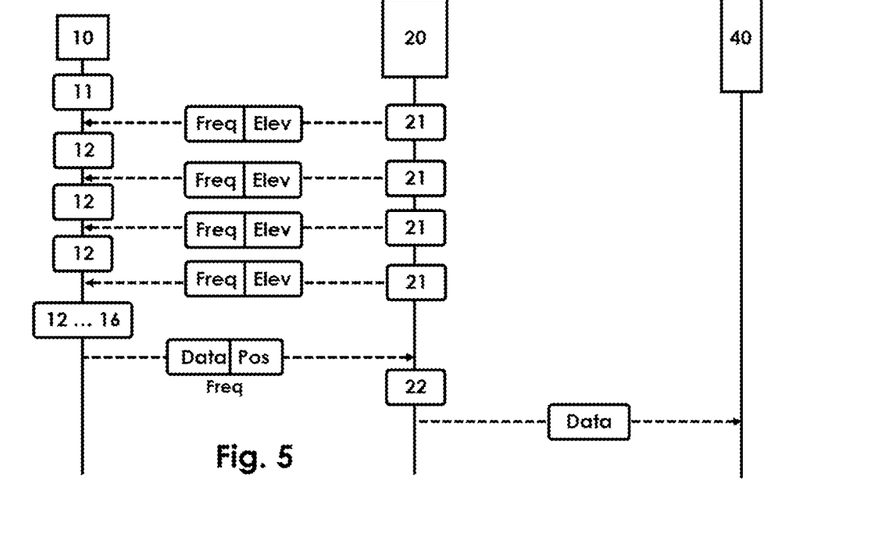
FIG. 5 is a schematic representation of exchanges between a ground-based device carrying out the method of FIG. 2 and a non-geostationary satellite carrying out the method of FIG. 4.

As represented at FIG. 5, the non-geostationary satellite 20 emits, in a step 21, a beacon signal comprising at least a frequency parameter and an elevation criterion parameter towards the celestial body it orbits. The beacon signal is received by the ground-based device 10, which performs step 12 of the method M1a, i.e. it performs a Doppler shift estimation based on the frequency of the received signal. The ground-based device 10 then stores the Doppler shift performed for later use in step 13 of estimation of a Doppler rate of frequency change.

In step 13, represented at FIG. 2 in the method M1a and at FIG. 5, the ground-based device performs an estimation of a Doppler rate of frequency change to obtain a position of the ground-based device 10 relative to the position of the non-geostationary satellite 20, the estimation being carried out by using an estimation method on a plurality of computed Doppler rates of frequency change, the estimation of a Doppler rate of frequency change comprising deriving the Doppler shift measures. For example, for N Doppler shift estimation f1, . . . , fN performed at times t1 to tN, the ground-based device 10 computes N-1 derivatives by computing:

$$\frac{df_k}{dt} = \frac{f_{k+1} - f_k}{t_{k+1} - t_k}$$

These Doppler shift derivatives (i.e. Doppler rates of frequency change) are then used as an entry in an estimation method, such as for example a least-squares estimation method, to determine the geometry of the current pass of the satellite, defined by its maximum elevation at peak, and the position of the ground-based device 10 temporally in that current pass. This is carried out by creating abacuses (i.e. one or several matrices), the abacuses giving the value of the Doppler shift as a function of the maximum elevation at peak and of the time before peak. The ground-based device 10 then interpolates in these abacuses using the estimation method, to obtain the values of maximum elevation at peak and time before peak from successive values of Doppler rates. Said abacuses are obtained from the following method:

$$\left(\frac{-1}{c}\right)*$$

$$\frac{R_e * R_{sat} * \sin(\omega * t) * \cos\left(\cos^{-1}\left(R_e * \frac{\cos(\theta_{max})}{R_{sat}}\right) - \theta_{max}\right) * \omega}{\sqrt{R_e^2 + R_{sat}^2 - 2 * R_e * R_{sat} * \cos(\omega * t) * \cos\left(\cos^{-1}\left(R_e * \frac{\cos(\theta_{max})}{R_{sat}}\right) - \theta_{max}\right)}} * f$$

With Re the radius of the celestial body, R_sat the addition of the altitude of the satellite and of the radius R of the celestial body, ω the angular velocity of the satellite in a celestial body centered fixed frame, in rad/s, θ_max the pass maximum elevation in radians, t the time before peak, c the speed of light, and f the frequency.

Thus, a position of the ground-based device 10 relative to the non-geostationary satellite 20 is obtained.

By applying an estimation method on the derivatives of Doppler shifts (i.e. Doppler rates of frequency change), the errors introduced by the low-cost oscillator(s) are removed, the only value impacting the result being the Doppler estimation variance.

Further, at a step 14 of the method M1a, the ground-based device 10 defines a transmission window, the transmission window being a period of time during which the position of the ground-based device 10 relative to position of the non-geostationary satellite 20 verifies the elevation emission criterion. Using the estimated current pass of the non-geostationary satellite 20 and the position of the ground-based device 10 temporally in the current pass, a window can be defined by deducing a start and end instants of a temporal window for which the elevation is above the elevation emission criterion, using for example the following equation to determine the elevation of the non-geostationary satellite 20 as a function of time:

$$\theta(t) = \cos^{-1}\frac{R_{sat} * \sin(\gamma(t))}{\sqrt{R_{sat}^2 - 2 * R_e * R_{sat} * \cos(\gamma(t)) + R_e^2}}$$

Where γ(t) is the distance between the nadir of the non-geostationary satellite 20 and the ground-based device 10 at a time t when represented in a spherical triangle as described in ["Doppler Characterization for LEO Satellites", Irfan Ali et al, March 1998]. The spherical triangle comprises three vertices M, N and P, where γ(t_0) is the distance between the vertices M (nadir of the non-geostationary satellite 20 at maximum elevation) and P (the ground-based device 10) and γ(t) is the distance between the vertices N (nadir of the non-geostationary satellite 20 at time t) and P (the ground-based device 10). The side between the vertices M and N is the angular distance measured on the surface of the celestial body along the ground trace from the time t to the time t_0 where the non-geostationary satellite 20 is at maximum elevation for the ground-based device 10.

γ(t) can be computed using the following formula:

$$\gamma(t) = \cos^{-1}\left(\frac{\cos\gamma_0}{\cos(\omega * (t_v - t_0))} * \cos(\omega * (t - t_0))\right)$$

where $$\cos\gamma_0 = \frac{R_e}{R_{sat}}$$

With t_0 is the instant at maximum elevation, t_v is the instant when the non-geostationary satellite 20 just becomes visible to the ground-based device 10, and γ_0 is the distance between the nadir of the non-geostationary satellite 20 and the ground-based device 10 at instant t_v.

Finally, R_sat can be found using the following formula:

$$R\_sat = \frac{\sqrt{\begin{array}{l}(R_e * \cos\theta_{max})^2 * \cos^2(\omega * (t_v - t_0)) * \left(\frac{1}{\sin\theta_{max}}\right)^2 - \\ 2 * (R_e * \cos\theta_{max}) * \cos(\omega * (t_v - t_0)) * R_e * \left(\frac{1}{\tan\theta_{max}}\right) * \\ \left(\frac{1}{\sin\theta_{max}}\right) + R_e^2 * \left(\frac{1}{\tan\theta_{max}}\right)^2 + R_e^2\end{array}}}{\cos(\omega * (t_v - t_0))}$$

At a step 15, a transmission time in the transmission window is defined. The transmission time can be defined randomly, as will be described later in another embodiment, or as the first time at which the position of the ground-based device 10 verifies the elevation criterion, or as the time at a predetermined fixed delay after the beginning of the transmission window, or any other definition.

In a step 16, the ground-based device 10 verifies that, at the transmission time comprised in the transmission window, the position of the ground-based device 10 relative to the position of the non-geostationary satellite 20 verifies the elevation emission criterion. This checking can be performed using the previously computed relative position of the ground-based device 10 to the non-geostationary satellite 20, using the previously Doppler shift measurements, or another estimation can be performed using a lower number of new Doppler shift derivatives, and Doppler rate computation. For example, this can be done using 3 received signals.

In a step 17 of the method M1a, the ground-based device 10 emits, at the transmission time and at the current reception frequency received in the beacon signal, at least one signal comprising at least the piece of data stored by the ground-based device 10. The signal emitted by the ground-based device 10 at step 17 can further comprise the position of the ground-based device 10 relative to the position of the non-geostationary satellite 20 as estimated at steps 13 or 16.

In another embodiment, the ground-based device 10 advantageously takes into account the fact that it is in an occulted environment or not before emitting at step 17. To do so, the ground-based device 10 carries out the step 17 of emission only if the ground-based device 10 receives another signal from the non-geostationary satellite 20 during a time period before the transmission time. This time period can be for example of 10 seconds. This permits to enhance the Quality of Service (QoS) by only emitting when possible and thus reducing the emissions resulting in no reception or a degraded reception by the non-geostationary satellite 20.

In a step 22 of the method M2a, and as represented at FIGS. 4 and 5, the non-geostationary satellite 20 receives the signal sent by the ground-based device 10 at the current reception frequency sent in the beacon signal, the signal comprising the at least one piece of data stored by at least one ground-based device 10. The received signal can also comprise the position of the ground-based device 10 relative to the position of the non-geostationary satellite 20 and a timestamp related to the time at which the position of the ground-based device 10 relative to the position of the non-geostationary satellite 20 has been estimated. This permits to locate the ground-based device 10 and/or to associate a location to the received piece(s) of data at the time of estimation of its position by the ground-based device 10. As the non-geostationary satellite 20 knows its absolute position, or as a ground-based satellite station 40 does so, the non-geostationary satellite and/or the ground-based satellite station 40 is able to compute the absolute position of the ground-based device 10 based on the position of the ground-based device 10 relative to the position of the non-geostationary satellite 20 and on the absolute position of the non-geostationary satellite 20.

Then, when the non-geostationary satellite 20 passes over a ground-based satellite station 40, the non-geostationary satellite 20 transmits the at least one piece of data to the ground-based station 40 as represented FIG. 5.

In another embodiment of the method M1a, the beacon signal sent by the non-geostationary satellite 20 and received by the ground-based satellite 20 further comprises at least one information of the current altitude of the non-geostationary satellite 20 at the time of emission of the signal. In this embodiment, the current altitude information can be used in the step 14 of defining a transmission window to define an adjusted transmission window. As shown before, the altitude intervenes in the computing of the abacuses. Using the altitude information, the ground-based device 10 can select the best fitted abacus, if several abaci have been implemented in the ground-based device 10. This choice is a trade-off between complexity and performance. The altitude also intervenes in the computation of visibilities durations and elevations. Taking into account the altitude in both cases permits to lower the estimation errors, and therefore to take less margin in estimating the transmission window. An adjusted transmission window is a transmission window better fitted for transmission, that is for example a larger transmission window to avoid signal collisions between the signals of different ground-based devices 10 emitting at the same time or during overlapping periods.

Figure 3:
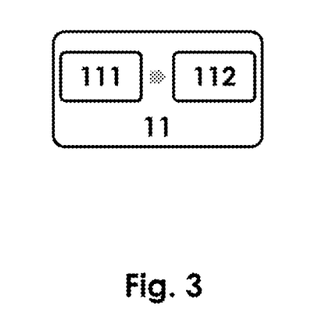
FIG. 3 is a schematic representation of a step of the method according to the invention carried out by the ground-based device.

In another embodiment of the method M1a compatible with the embodiment where the beacon signal comprises an altitude information, the ground-based device 10 uses an enhanced wake-up method and the step 11 of entering an awaken mode comprises two sub-steps 111 and 112 as represented at FIG. 3.

In a first sub-step 111, a reduced wake-up time window is computed by the ground-based device 10. The computing of a reduced wake-up time window comprises computing orbital period of the non-geostationary satellite 20 using previous received signals from the non-geostationary satellite 20 at sub-step 121 during other passes of the non-geostationary satellite 20.

The reduced wake-up time window computing comprises three sub-steps:

First, a computing or retrieving of the orbital period. This sub-step can be carried out using the altitude comprised in the beacon signal in the previous embodiment and/or using a peak-to-peak algorithm described later. When using the altitude, the orbital period can be found using the following formula:

$$T = 2*\pi*\frac{\sqrt{(R_{sat})^3}}{\mu}$$

with T the non-geostationary satellite 20 orbital period, p the celestial body standard gravitational parameter (the product of the gravitational constant of the celestial body and its mass), R_sat the radius of the non-geostationary satellite 20, computed by adding the altitude of the non-geostationary satellite 20 with the radius R_e of the celestial body the non-geostationary satellite 20 is orbiting.

Secondly, a determination of the peak of the current pass. This can be done using the defining of a transmission window at step 14, or by observing the change of sign of the Doppler shift (when the Doppler shift is null, it means that the non-geostationary satellite 20 is at the peak of its current pass).

Thirdly, an application of the orbital period to estimate the next pass at the determined peak (with an error margin). When applying the orbital period to determine the time of the next pass, the following points must be taken into account:

If the non-geostationary satellite 20 passes from an ascending (from South to North) (respectively descending, from North to South) to an ascending (respectively descending) pass, the difference between two peaks is equal to one orbital period.

If the non-geostationary satellite 20 passes from an ascending (respectively descending) to a descending (respectively ascending) pass, the difference between two peaks is no longer equal to one orbital period but to (1+f1)*orbital period (respectively (1+f2)*orbital period). These fractions f1 and f2 are computed using the peak-to-peak algorithm described later.

The peak-to-peak algorithm will now be described.

At each pass of the non-geostationary satellite 20 at the peak, the ground-based device 10 stores the time and associates it to the non-geostationary satellite 20. Then, from all the stored times, the ground-based device 10 determines the orbital period. It also determines the f1 and f2 fractions previously mentioned:

To obtain the orbital period, the ground-based device 10 first divides a delta time between peaks by a hardcoded orbital period estimate value. The hardcoded value is an orbital period known of a satellite for example at 550 km altitude for the first computation. For example, at initialization, the ground-based device 10 uses an orbital period of 95.6 minutes for a satellite at an altitude of 550 km.

If the computation is carried out between two passes from an ascending pass to an ascending pass or from a descending pass to a descending pass, this division gives substantially an integer. By dividing the delta time between peaks by this obtained integer a plurality of times for different delta times between peaks and by computing the mean value of the result, a precise value for the orbital period is found.

If the computation is carried out between two passes from an ascending pass to descending pass or from a descending pass to an ascending pass, the division performed several times and the computing of the mean values gives the fractions f1 (from an ascending pass to descending pass) and f2 (from a descending pass to an ascending pass).

In order to obtain the orbital period, only the passes from an ascending pass to an ascending pass or from a descending pass to a descending pass can be used if enough passes are available to perform the computation. If there are not enough passes, all the passes can be used to obtain the orbital period which then takes into account the passes from an ascending pass to descending pass or from a descending pass to an ascending pass.

Once the next pass or passes is/are known, the ground-based device 10 defines reduced time windows during which to wake-up, drastically reducing the power consumption. From an initial time T0 at which the non-geostationary satellite 20 is above the ground-based device 10, the ground-based device 10 must then wake-up:

from an ascending pass to an ascending pass or from a descending pass to a descending pass: at a time T0+T, T being the orbital period from an ascending pass to a descending pass: at a time T0+T*f1 from a descending pass to an ascending pass: at a time T0+T*f2

To even further reduce the number of time windows during which to wake-up, the beacon signal emitted by the non-geostationary satellite 20 can further comprise an information related to the type of pass (ascending or descending pass).

In a sub-step 112, the ground-based device 10 only enters the awaken mode during the defined reduced time window. This advantageously allows to reduce the energy consumption of the ground-based device 10 by only searching for a signal from the non-geostationary satellite 20 in reduced time windows during which the non-geostationary satellite 20 is passing close to the ground-based device 10.

Figure 6:
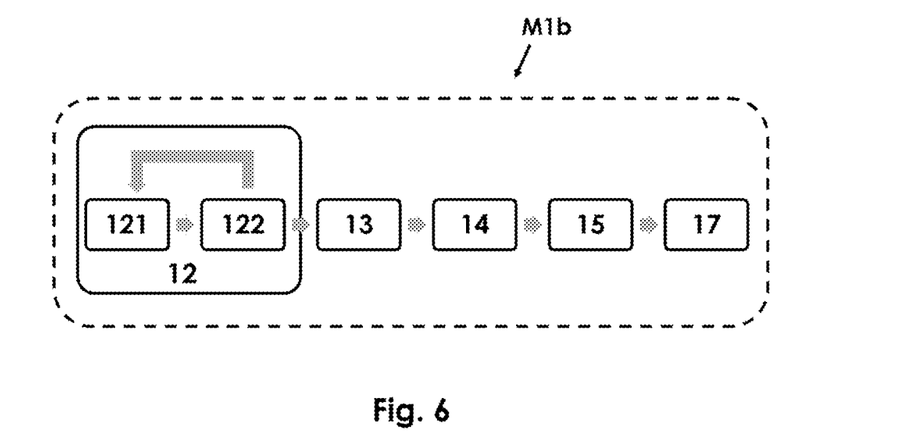
FIG. 6 is a schematic representation of another method according to the invention carried out by a ground-based device.

A second method according to the invention is represented FIG. 6. The method M1b represented FIG. 6 is carried out by a plurality of ground-based devices 10 and comprises five steps. Each ground-based device 10 carries out the method on its own, the method M1b enabling to reduce collisions between signals when at least two ground-based devices 10 want to emit to the non-geostationary satellite 20 while being both in the radio coverage of the non-geostationary satellite 20 at the same time or during overlapping periods.

Steps 12, 13, 14 and 17 of the method M1b are the same as steps 12, 13, 14 and 17 of method M1a. The method M1b does not comprise the step 16 of checking if, at a transmission time comprised in the transmission window, the position of the ground-based device 10 relative to the position of the non-geostationary satellite 20 verifies the elevation emission criterion.

Indeed, in the method M1b, the transmission time is randomly defined. The invention of method M1b advantageously relies on the fact that by using a randomisation of the emission in the transmission window, the probability of collision is greatly reduced and becomes independent of the distribution of the ground-based devices 10 in the radio coverage of the non-geostationary satellite 20. This is particularly advantageous when a significant number of ground-based devices 10 need to emit in the same limited area.

Therefore, the step 15 of method M1b is the step 15 of the method M1a of defining a transmission time, the transmission time being comprised in the transmission window, but the step 15 of method M1b is limited to the transmission time being defined randomly compared to the step 15 of the method M1a. This permits to remove the need for synchronisation between ground-based devices 10 when they both want to emit in the radio coverage of the non-geostationary satellite 20.

Preferably, a slotted ALOHA scheme is implemented. The slotted ALOHA scheme needs a time reference to be implemented, to define slots of time at the start of which the ground-based devices 10 should try to emit. This time reference is therefore comprised in the signal sent by the non-geostationary satellite 20. For example, a time reference can be the reception time by the ground-based device 10 of the first bit of the "data" part of the signal sent by the non-geostationary satellite 20. The slotted ALOHA scheme defines slots of a predetermined duration, and only allows ground-based devices to emit at the start of each slot. This allows to further reduce the risks of collisions when two or more ground-based devices 10 want to emit in the radio coverage of the non-geostationary satellite 20. The Slotted ALOHA scheme can be implemented together with the randomization of the transmission time, the time slot of emission in the slotted ALOHA scheme being defined randomly.

The method M1b can further comprise the step 11 of the method M1a of entering an awaken mode, and the enhanced awakening mode, thereby reducing the energy consumption for each ground-based device 10.

As in the method M1a, the step 14 of defining a transmission window can further use an altitude information to define an adjusted transmission window.

Figure 7:
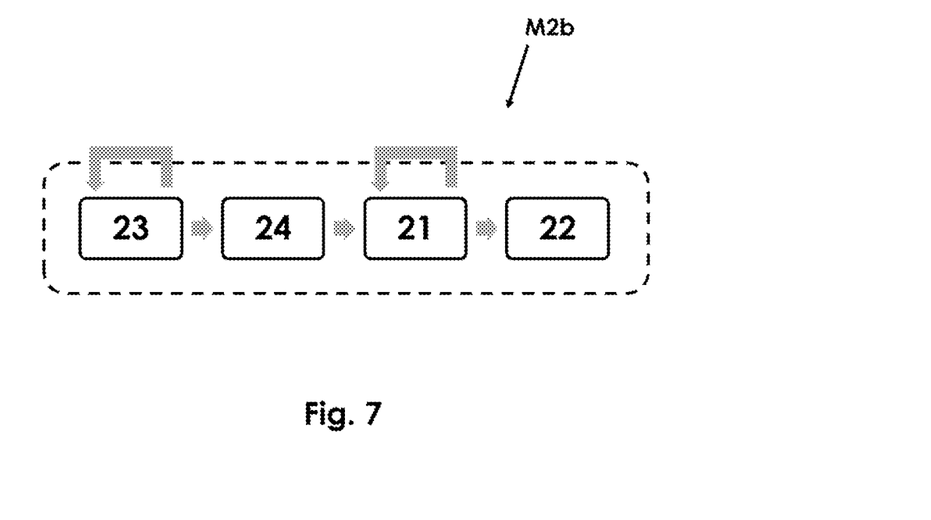
FIG. 7 is a schematic representation of another method according to the invention carried out by a non-geostationary satellite.

A third method according to the invention is represented at FIG. 7. The method M2b represented at FIG. 7 is carried out by a non-geostationary satellite 20 and comprises four steps. The method M2b comprises the steps 23 of performing periodically at least one radio coverage measurement and 24 of computing a dynamic elevation emission criterion based on the last radio coverage measurement performed, and the steps 21 and 22 of the method M1b of respectively emitting a signal and receiving a signal.

In a first step 23, the non-geostationary satellite 20 performs periodically at least one radio coverage measurement. The radio coverage measurement can be performed non-stop. It can also be performed for a period long enough to determine that the state of the observed system is sufficiently stationary to last in the future, for example dozens of seconds. The radio coverage measurement can for example comprise a spectrum analysis, a noise floor measurement and an interferences measurement, for example using an SDR payload (for "Software Defined Radio" payload), for example at 14 dBm of 100 Hz (100 bits per second) in the ISMs bands close to 868 MHz.

When the radio coverage measurement of step 23 is performed, the non-geostationary 20 defines an elevation criterion or updates an existing elevation criterion in a step 24. This definition at step 24 can comprise for example performing a link budget computation.

A link budget computation comprises estimating the link margin in decibels for different elevations between the ground-based device 10 and the non-geostationary satellite 20. For example, for a minimal elevation of 20 degrees and no interfering noise, at 14 dBm of 100 Hz (100 bits per second) in the ISM band close to 868 MHz, the link margin can be of 2.5 dB, meaning that it is possible for the non-geostationary satellite 20 to receive a signal emitted by the ground-based device 10 with such an elevation. Therefore, the non-geostationary satellite 20 can set the dynamic elevation criterion to a value of 20 degrees. But, a minimal elevation of 20 degrees and interfering noise, at 14 dBm of 100 Hz (100 bits per second) in the ISM band close to 868 MHz, the link margin can be of −5.2 dB, meaning that the non-geostationary satellite 20 would not receive a signal emitted by the ground-based device 10 with such an elevation. The next minimum elevation with a positive link margin is an elevation of 40 degrees with a link margin of 0.8 dB. The non-geostationary satellite 20 can then set the dynamic elevation criterion to a value of 40 degrees, resulting in a useful coverage reduced by 1150 km, i.e. nearly 75% compared to the case without interfering noise, but ensuring that no frames are lost and therefore that the coverage and Quality of Service match as closely as possible the current environment.

The description made here considers a homogeneous noise level over the entire 200 kHz channel. One could very well understand that the invention further covers when the beacon transmits different elevation criteria per band slice (e.g. 50 kHz or 10 kHz) depending on the noise level measured in each of the slices.

When a dynamic elevation emission criterion has been set, the non-geostationary satellite 20 performs the steps 21 and 22 of the method M2a, that is it emits the signal comprising the elevation emission criterion periodically and, if the position of the non-geostationary satellite 20 relative to the position of the ground-based device 10 verifies the dynamic elevation emission criterion, it receives at least one signal sent by the ground-based device 10, the signal comprising at least one piece of data stored by at least one ground-based device 10. The emission of the beacon signal by the non-geostationary satellite 20 can be performed periodically while the elevation emission criterion does not change, and when it has been changed, continue to emit periodically the new elevation emission criterion.

Thanks to the method M2b, the elevation emission criterion is dynamic, that is the elevation emission criterion comprised in the signal sent periodically towards the Earth changes as a function of the radio coverage measurement carried out by the non-geostationary satellite 20. This allows to have a better Quality of Service as the ground-based device 10 uses an elevation criterion that is coherent with the real current radio coverage of the non-geostationary satellite 20.

Figure 8:
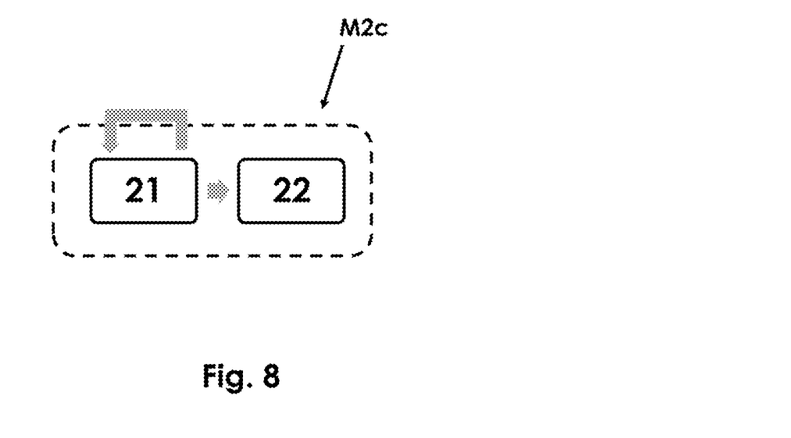
FIG. 8 is a schematic representation of another method according to the invention carried out by a non-geostationary satellite.

A fourth method according to the invention is represented FIG. 8. The method M2c represented FIG. 8 is carried out by a non-geostationary satellite 20 and comprises two steps.

The method M2c is a method for the transmission of a region-specific piece of information from at least one non-geostationary satellite 20 to at least one ground-based device 10, the method M2c being carried out by the non-geostationary satellite 20 and comprising a least the step 21 of emitting at least one signal periodically towards the Earth, the signal comprising the region-specific piece of information and an elevation criterion, the region-specific piece of information being specific to a region around the nadir of the non-geostationary satellite 20, the elevation criterion being relative to the region around the nadir of the non-geostationary satellite.

In an embodiment, the region-specific piece of information in the signal emitted at step 21 of the method M2c is a regional reception frequency of the satellite 20, to be used by the ground-based device 10 when emitting to the non-geostationary satellite 20 when the ground-based device 10 is in the region around the nadir of the non-geostationary satellite 20. When the region-specific piece of information is a regional reception frequency of the satellite 20, the method M2c can comprise another step 22 of, if the position of the non-geostationary satellite 20 relative to the position of the ground-based device 10 verifies the elevation emission criterion, receiving at least one signal sent by the ground-based device 10 at the regional reception frequency of the non-geostationary satellite 20.

In an embodiment, when the nadir of the non-geostationary satellite 20 changes region, the region-specific piece of information comprised in the signal changes. This applies to a regional reception frequency.

The region around the nadir is defined by performing a trade-off between an information refresh rate of the region-specific piece of information and a size of incertitude of the region-specific piece of information. It is understood by "information refresh rate" a rate at which the region-specific piece of information will be considered valid by the ground-based device 10. For example, the transmission rate can be of two hours, meaning that the ground-based device 10 is considered to have received a valid piece of information every two hours. When performing the trade-off, the "information refresh rates" are evaluated for different elevations, for example 70, 75, 80 and 85 degrees respectively, corresponding to an incertitude (or region) centered around the Nadir point with a diameter of 351 km, 259 km, 171 km and 85 km (corresponding diameters for a non-geostationary satellite 20 orbiting at an altitude of 525 km).

The results show that the smaller the accuracy sought in the size of the region around the nadir, the higher the transmission rate.

Figure 11:
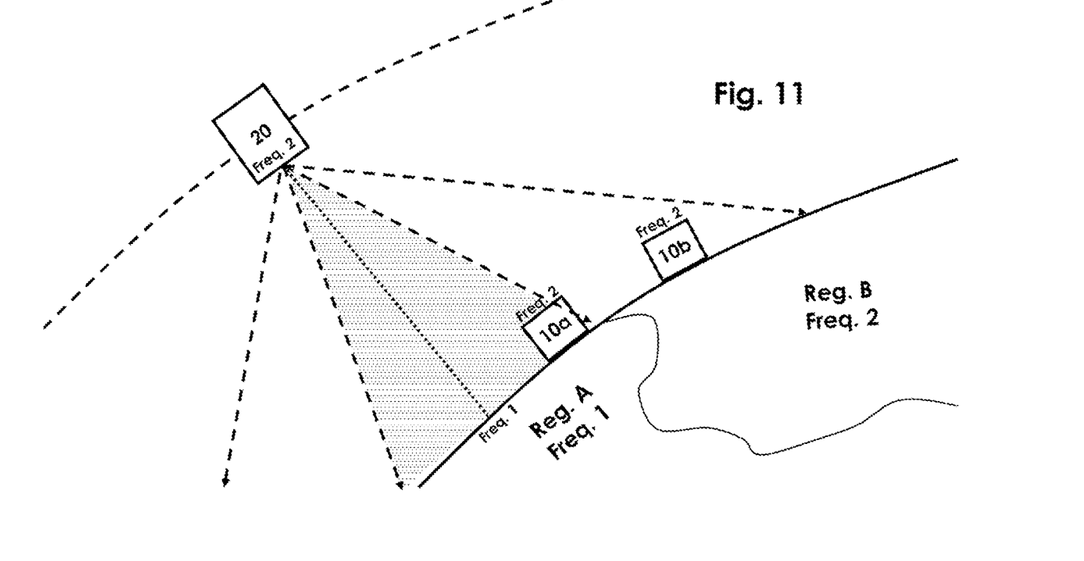
FIG. 11 is a schematic representation of the broadcasting of regional information by a non-geostationary satellite and the reception of the information by two ground-based devices.
Figure 12:
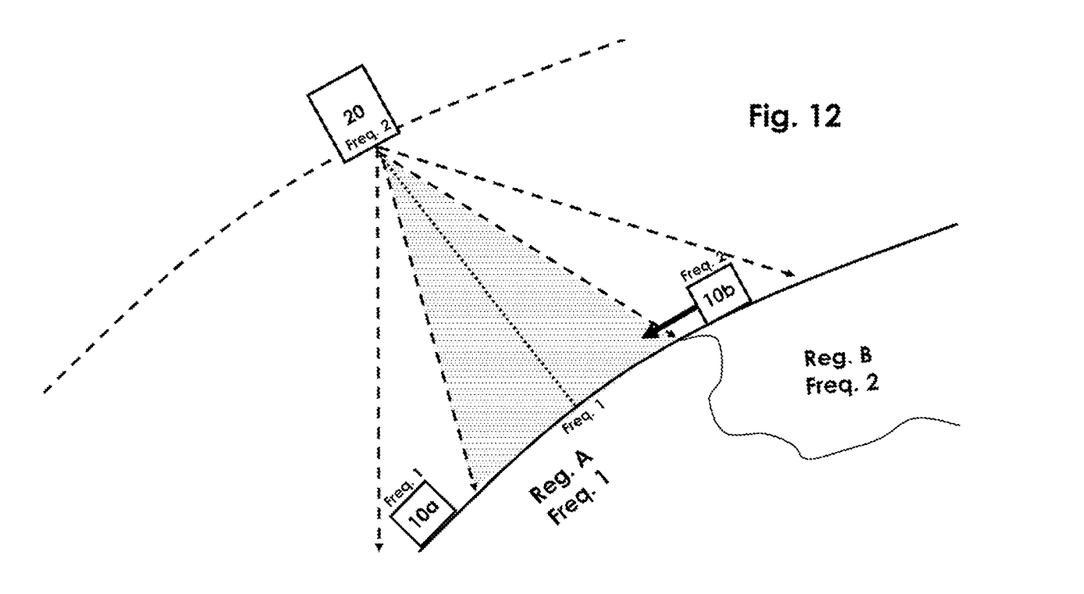
FIG. 12 is a schematic representation of the broadcasting of regional information by a non-geostationary satellite and the reception of the information by two ground-based devices.

The signal emitted by the non-geostationary satellite 20 can further comprise the current reception frequency of the non-geostationary satellite 20. This is represented at FIGS. 10 to 12.

Figure 9:
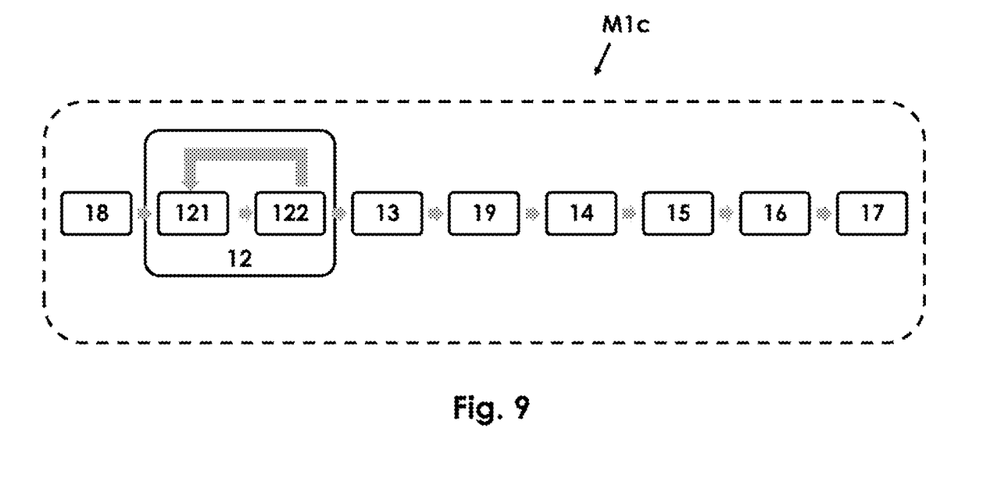
FIG. 9 is a schematic representation of another method according to the invention carried out by a ground-based device.
Figure 10:
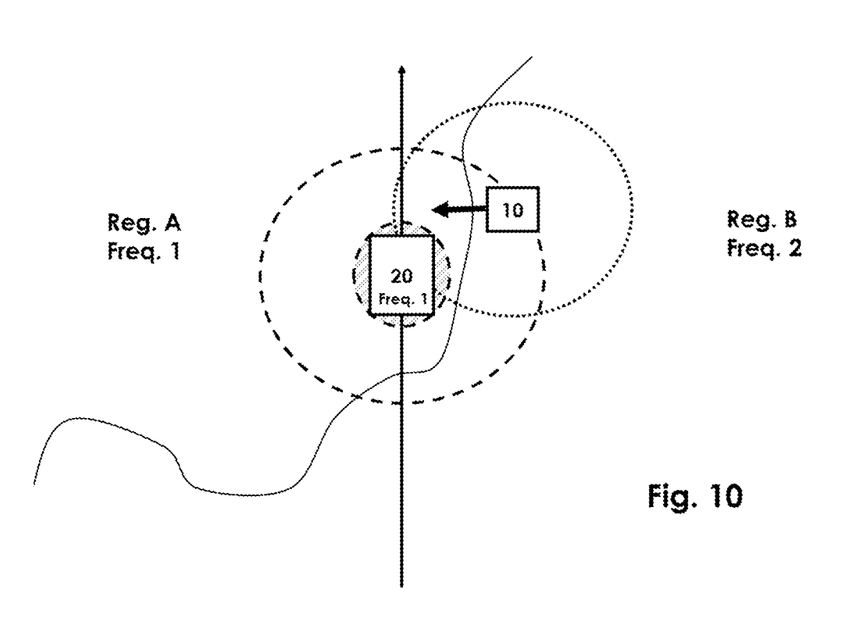
FIG. 10 is a schematic representation of the broadcasting of regional information by a non-geostationary satellite and the reception of the information by a ground-based device located in another region.

The example represented at FIG. 10 comprises a non-geostationary satellite 20 with a reception frequency set as "frequency 1". The non-geostationary satellite 20 passes over region A for which the regulatory frequency is frequency 1. The ground-based device 10 is in radio coverage of the non-geostationary satellite 20 and, as shown in the method M1c represented at FIG. 9, in a step 18, the ground-based device 10 receives the beacon signal comprising two pieces of information related to frequencies: the reception frequency Frequency 1 of the non-geostationary satellite 20, and the regulatory frequency in a region around the nadir of the position of the non-geostationary satellite 20, which is also Frequency 1 at FIG. 10. The beacon signal can further comprise, with the regulatory frequency, a regional elevation criterion, i.e. a criterion defining the size of the region around the Nadir. The elevation criterion can alternatively be determined or evaluated by the ground-based device 10. In a step 19, if the position of the non-geostationary satellite 20 relative to the position of the ground-based device 10 verifies the regional elevation criterion, that means that the ground-based device 10 is inside the defined region around the Nadir (the hatched area of FIG. 10), so the ground-based device 10 defines its emission frequency as being the regional frequency, i.e. frequency 1 in FIG. 10. As shown in FIG. 10 with the arrow, this is particularly advantageous if the ground-based device 10 moves from the region B to the region A, and if the ground-based device 10 is configured to emit at frequency 2 of region B, when it should use the frequency 1, as it is the regulatory frequency of region A. As the ground-based device 10 is then in the region around the nadir of the non-geostationary satellite 20, it can set the reglementary frequency to frequency 1 as it verifies the regional elevation criterion. The invention permits to maintain a correct regional information in the ground-based device 10 by only defining the regional information as "correct" in the ground-based device 10 when the position of the ground-based device 10 relative to the non-geostationary satellite 20 verifies the regional elevation criterion. Indeed, the regional elevation criterion defines the hatched region around the nadir of the non-geostationary satellite 20. In this embodiment, it is important to note that the regional elevation criterion and the elevation emission criterion are two different elevation criteria: the regional elevation criterion defines the region around the Nadir of the non-geostationary satellite 20 and is used by the ground-based device 10 to store the region-specific piece of information if the ground-based device 10's position verifies the regional elevation criterion, while the elevation emission criterion is used for the ground-based device 10 to know if it is condition (i.e. well positioned) to emit to the non-geostationary satellite 20.

Preferably, and as represented at FIG. 9, the position will be obtained as in the method M1a, thus leveraging the use of the beacon signal, and limiting the energy consumption of the ground-based device 10 to obtain a position. It will be understood that the invention described in steps 18 and 19 is not limited to the acquisition of the position using step 12 to 16, but to any way of acquiring the position of the ground-based device 10.

As represented at FIG. 9, the method M1c comprises the step 12 of estimating successive Doppler shifts, and the step 13 of estimating a Doppler rate of frequency change to obtain a position of the ground-based device 10 relative to the position of the non-geostationary satellite 20. When a position has been obtained, the step 19 can be performed. Further, optionally, the steps 14 to 16 can be performed for the ground-based device 10 to emit using the internally set regulatory frequency.

As represented at FIG. 11, the ground-based device 10a is in the region around the nadir of the non-geostationary satellite 20. The reception frequency of the satellite is set to Frequency 2 and the regulatory frequency, i.e. the region-specific piece of information, is Frequency 1. In this embodiment, the non-geostationary satellite 20 advertises the regional reception frequency as well as its own reception frequency. When the ground-based device 10a receives the beacon signal from the non-geostationary satellite 20, it checks if its position verifies the regional elevation criterion, which is the case, as it is positioned in the cone in the hatched area of FIG. 10. Therefore, in step 19, the ground-based device 10a defines its frequency as the regional frequency "frequency 1". After, it checks if the current reception frequency received in the beacon is equal to the current reception frequency of the non-geostationary satellite 20, which is then not the case. Therefore, the ground-based device 10a does not emit its message. The position of the ground-based device 10b does not verify the regional elevation emission criterion (i.e. it is not in the hatched area), so it does not set its frequency as the regional frequency. However, the ground-based device 10b has its emission frequency set at Frequency 2 and therefore can emit to the non-geostationary satellite 20 as the non-geostationary satellite 20 has a reception frequency also set at Frequency 2. Such cases where the current reception frequency set in the non-geostationary satellite 20 and the regional frequency are different can happen for example when the non-geostationary satellite 20 is going to cross a border between a first region it is in and a second region it will be in and the distribution of ground-based devices 10 is more important in the second region.

As represented at FIG. 12, the ground-based device 10a is not located in the region around the nadir (i.e. in the hatched area) of the non-geostationary satellite 20 and has its emission frequency set to the regional frequency of region A: frequency 1. As the non-geostationary satellite has a reception frequency set to Frequency 2, the ground-based device 10a cannot emit to the non-geostationary satellite 20, even though the position of the ground-based device 10a verifies the elevation emission criterion. The ground-based device 10b has its emission frequency set to Frequency 2. It can emit to the non-geostationary satellite 20 as its emission frequency is the same as the reception frequency of the non-geostationary satellite 20 and the ground-based device 10b also verifies the elevation emission criterion. If the ground-based device 10b moves from region B, where the regional frequency is frequency 2, to the region A, where the regional frequency is frequency 1, the ground-based device 10b still has its emission frequency set to Frequency 2. It can thus still emit to the non-geostationary satellite 20, as their frequencies are the same. But, the ground-based device 10b is forbidden to use the frequency 2 as its emission frequency should now use the frequency 1 as it is in the region A. The invention permits to solve this problem. To do so, as the ground-based device 10b enters the hatched area, i.e. the region around the Nadir of the non-geostationary satellite 20, the position of the ground-based device 10b now verifies the regional elevation criterion and now sets its emission frequency as the regional frequency broadcasted in the beacon signal by the non-geostationary satellite 20. Its newly set emission frequency is now the regional frequency Frequency 1. The problem is solved, as the ground-based device 10b having changed regions now has the correct regional frequency set as its emission frequency, i.e. Frequency 1. Having solved this problem, the ground-based device 10b cannot emit to the non-geostationary satellite 20 as their frequencies differ, which is the expected behaviour.

The invention claimed is:

1. A method for the transmission to at least one non-geostationary satellite of at least one piece of data stored by a ground-based device, the method being carried out by the non-geostationary satellite and comprising:
    performing periodically at least one radio coverage measurement,
    computing a dynamic elevation emission criterion based on the last radio coverage measurement performed, and
    emitting at least one signal periodically towards the Earth, the signal comprising at least the dynamic elevation emission criterion,
    when the position of the non-geostationary satellite relative to the position of the ground-based device verifies the dynamic elevation emission criterion:
        receiving at least one signal sent by the ground-based device, the signal comprising at least one piece of data stored by at least one ground-based device.

2. The method according to claim 1, wherein the radio coverage measurement comprises a spectrum analysis, a noise floor measurement and an interferences measurement.

3. The method according to claim 1, wherein the dynamic elevation emission criterion computing comprises computing a link budget, the link budget computation being carried out using the radio coverage measurement, a satellite reception frequency and a satellite radio coverage for the reception frequency.

4. The method according to claim 1, wherein the periods at which the radio coverage measurement and the emission are performed are different.

5. A communication system for the transmission to at least one non-geostationary satellite of at least one piece of data stored by a ground-based device wherein the non-geostationary satellite is configured to carry out the method according to claim 1.

6. The communication system according to claim 5, wherein the non-geostationary satellite is a low Earth orbit satellite.

7. The communication system according to claim 5, wherein the ground-based device is a resource-constrained device.

8. A non-transitory computer program product comprising instructions which, when the instructions are executed by a computer, cause the computer to carry out the method according to claim 1.

9. A non-transitory computer-readable medium comprising instructions which, when executed by a computer, cause the computer to carry out the method according to claim 1.

* * * * *